3,676,195
WATER-RESISTANT MATERIALS, AND METHODS OF PRODUCTION AND USE OF SAME

Clifton L. Kehr, Silver Spring, and Walter R. Wszolek, Sykesville, Md., assignors to W. R. Grace & Co., New York, N.Y.
No Drawing. Continuation-in-part of application Ser. No. 617,801, Feb. 23, 1967, which is a continuation-in-part of application Ser. No. 567,841, July 26, 1966. This application July 29, 1969, Ser. No. 845,908
Int. Cl. B44d 1/50; C08f 1/18
U.S. Cl. 117—93.31                32 Claims

ABSTRACT OF THE DISCLOSURE

Water-resistant materials having improved electrical and mechanical properties can be produced from an element which includes a liquid photocurable composition absorbed into and onto a porous support layer. The process includes, for example, impregnating a porous support layer with a liquid photocurable composition and exposing the photocurable element to U.V., electron beam or gamma radiation. The support layer containing the photocured composition is water-resistant and has improved properties. The liquid photocurable composition contains at least a polyene, a polythiol, and optionally a photocuring rate accelerator. The products, for example, can be used as water-proofed fabrics, or composite structures.

HISTORY OF THE INVENTION

This application is a continuation-in-part application of copending application Ser. No. 617,801 (filed: Feb. 23, 1967; inventors: C. L. Kehr and W. R. Wszoley) which was a continuation-in-part application of application Ser. No. 567,841 (filed: July 26, 1966; inventors: C. L. Kehr and W. R. Wszoley), said application Ser. No. 567,841, now abandoned, but which was copending with application Ser. No. 617,801 now abandoned.

OBJECTIVES OF THE INVENTION

It is an object of this invention to provide a new and improved water-resistant reinforced composite structure material having improved mechanical and electrical properties. A further object is to provide such material by photocuring a photocurable composition absorbed onto and into a porous support. A further object is to produce such materials from photocurable compositions which are liquid in nature. Still further objects will be apparent from the following description of this invention.

BROAD DESCRIPTION OF THE INVENTION

This invention broadly involves a process for preparing a water-resistant material having improved electrical and mechanical properties. The material is porous, fibrous, etc.; is usually in sheet form; and is termed herein a support layer or porous support layer. The support layer is preferably essentially transparent to actinic radiation and translucent to visible light and preferably has a thickness of less than 0.1 inch. Although if the support layer is comprised of an ultraviolet transparent fiber, the support layer can have a thickness of up to about ½ inch. The water-resistant material is prepared from a photocurable element which includes a porous support layer and a photocurable composition absorbed into the support layer and onto one or both surfaces thereof. The amount of photocurable composition in the surface is normally extremely minimal, as it is normally wiped or scraped off. Preferably the photocurable composition is only absorbed throughout the entire thickness of the support layer. The term "porous support layer" includes a unitary layer or a laminated multiplicity of porous sheets, fibrous webs, fabrics and sheets (woven, compressed, non-woven, bonded, and so forth). Useful porous support layers include fibrous glass; fibrous polyester; fibrous polyamide; paper; fibrous polystyrene; fibrous low density polyethylene; fibrous polypropylene; etc. The photocurable composition is applied initially as a liquid, and, after absorption into the porous support layer, it may solidify to the extent that it may crystallize at ambient temperatures or that any solvent, etc., evaporates or is evaporated off. The process itself involves exposing the layer containing the photocurable composition to actinic radiation containing a substantial portion of ultraviolet, electron beam or gamma radiation, whereby the photocurable composition is hardened (preferably to an insoluble state).

This invention also includes the initial photocurable element and the resultant water-resistant element.

If the porous support (containing the photocurable composition) is flexible, etc., the support can be stored and shipped in a compacted or folded form, then can be shaped or molded into a desired form, and then "set" to a rigid condition when exposed to ultraviolet light (or electron beam or gamma radiation). No substantial heat is generated and no post-heating is required. This way, rigid structures can be easily made. Also, air inflated fabric structures used for temporary shelter could be coated (if not precoated, etc.), exposed to sunlight for about ten minutes to several hours and then utilized as a shelf-supporting structure.

DETAILED DESCRIPTION OF THE INVENTION

The porous support layers of this invention can be such materials as porous or fibrous polymers, or fibrous paper, glass felt or cloth, etc. The useful fibrous wood papers are made from mechanical pulp (groundwood), chemical pulp and semi-chemical pulp (and reclaimed wood pulps). Mechanical pulp comes in several grades and produces a paper which is very absorbent. The two principal types of chemical pulp are sulfite pulp and sulfate pulp (bleached, semibleached and unbleached). The unbleached sulfite pulp produces a paper which is very strong. Bleached sulfite pulp produces a paper which is very strong and is very absorbent (but soft). Any of the coniferous or deciduous woods can be used as a pulp source. It should be noted that a balance must be attained between the wet strength, and the absorption capacity for the paper for the photocurable composition. The paper can contain fillers that are compatible with the photocurable composition and do not reduce the paper's absorption ability for the photocurable composition below a tolerable level. Papers often contain up to 40 percent by weight fillers. Typical fillers are kaolin, titanium dioxide (e.g., anatase and rutile), calcium carbonate, zinc sulfide, lithopone, etc. In certain cases the photocurable composition will absorb onto the filler, along with the wood fibers. Other materials, such as starches; natural gums, e.g., guar and locust bean; modified celluloses, e.g., carboxymethyl and hydroethyl derivatives; polymers and the ureaformaldehyde and melamine-formaldehyde types; etc.; can be added to increase the fiber-to-fiber bonding and wet strength of the paper. Any such fillers or other additives, however, must be added with some discretion so that they do not interfere with the photocuring reaction which is initiated by exposure to actinic radiation.

The degree of penetration of liquids into the paper is controlled to a great degree by the degree of sizing of the paper. Sizing is the process of adding materials to the paper in order to reduce the absorbence ability of the paper. Unsized paper freely absorbs liquids. Typical sizing agents are resin, synthetic resins, cellulose derivatives, asphalt emulsions, various hydrocarbons and natural waxes, starches, glues, casein, "Aquapel," etc. The sizing agent "Aquapel" is the trade name for an alkyl ketene dimer which is commercially available from Hercules Powder Co.

Fibrous papers can be made from other natural fiber sources, such as hemp, cotton, jute, cereal straw, esparto, bagasse, etc. Fibrous papers can be made from inorganic fibers, such as asbestos, glass, etc. Also, woven and nonwoven fibrous papers can be made from certain synthetic organic polymers, such as nylon, polyolefins, etc. In the case of these latter fibrous papers, synthetic organic polymers (as fibrous materials) can be utilized which are not porous enough to use in sheet form.

Examples of cloth supports include loosely or tightly woven cotton sheets, wool sheets, and the synthetic organic polymer (fiber) sheets.

The porous support layer can be a porous synthetic or natural organic polymeric sheet, examples of which are cellulose ($Qw=1600$ at 35° C.); cellulose acetate ($Qw=1200$ at 39.5° C.); cellulose nitrate ($Qw=630$ at 40° C.); polybutadiene ($Qw=680$ at 39.5° C.); polychloroprene ($Qw=39.5°$ C.); polyisoprene (natural rubber) ($Qw=270$ at 39.5° C.); poly(hexamethylene adipate-co-sebacate) ($Qw=180$ at 39.5° C.); poly(methyl methacrylate) ($Qw=550$ at 39.5° C.); polystyrene ($Qw=170$ at 39.5° C.); poly(vinyl alcohol) ($Qw=1500$ at 35° C.); polyethylene (low or high density); poly(hexamethylene adipate-co-aminocaproate); ethyl cellulose; and poly(4,4-isopropylidene-diphenylene carbonate). The preferred porous organic polymers are cellulose and cellulose acetate.

The term $Qw$ found in the above paragraph is the transmission rate of water through certain porous polymers. The transmission rate Q has the following formula:

$Q =$ (amount of permeant) (film thickness)/(area time)

and Q is usually presented herein with the units; (gm.) (ml.)/(m.$^2$) (24 hours). The transmission rate does not consider pressure nor concentration of permeant. The transmission rate of water through a particular polymer usually must be above about 100 (in the above units) in order for the porous polymer to be useful within this invention. If the photocurable composition is in a non-aqueous liquid system before it is absorbed into the porous support layer, the liquid(s) used to suspend or as a solvent for the photocurable components (polyene, polythiol, etc.) must have a transmission rate of above about 100 for the particular porous support layer.

A porous sublayer can be placed on any suitable support layer (porous or nonporous) and then the photocurable composition can be absorbed into the porous sublayer on the support layer. Optionally the impregnated porous sublayer can also be covered with a suitable cover layer (porous or nonporous) to give greater convenience in handling the photocurable element.

The support layer should be preferably transparent, in which case if the support layer contains a porous subbing, such porous subbing should be essentially transparent. The term "essentially transparent" as used within the scope of this invention and in all cases includes the terms "transparent" or "translucent," and applies specifically to the incident actinic radiation which initiates the photocuring reaction at the desired point in the process of this invention.

The crucial ingredients in the photocurable compositions are:

(1) About 2 to about 98 parts by weight of an ethylenically unsaturated polyene containing two or more reactive unsaturated carbon-to-carbon bonds; and
(2) about 98 to about 2 parts by weight of a polythiol.

Up to about 50 parts by weight [based on 100 parts by weight of (1) and (2)] of a photocuring rate accelerator can be incorporated into the photocurable composition. (Preferred range of photocuring rate accelerator is about 0.0005 to about 30 parts by weight.) The photocuring rate accelerator is optional in that it can be used when a fast photocure is desired.

The reactive carbon-to-carbon bonds of the polyenes are preferably located terminally, near terminally, and/or pendant from the main chain. The polythiols, preferably contain two or more thiol groups per molecule. These photocurable compositions are usually, and preferably, liquid at room temperatures, although the compositions can be solid, crystalline, semisolid, etc., at those temperatures, but which are liquid at 130° C.

Included in the term "liquid," as used herein, are those photocurable compositions which in the presence of inert solvent, aqueous dispersion or plasticizer have a viscosity ranging from essentially zero to 20 million centipoises between 20° C. and 130° C.

As used herein polyenes and polyynes refer to simple or complex species of alkenes or alkynes having a multiplicity, i.e., at least 2, "reactive" carbon-to-carbon unsaturated functional groups per average molecule. For example, a diene is a polyene that has two "reactive" carbon-to-carbon double bonds per average molecule, while a diyne is a polyyne that contains in its structure two "reactive" carbon-to-carbon triple bonds per average molecule. Combinations of "reactive" double bonds and "reactive" triple bonds within the same molecule are also operable. An example of this is monovinylacetylene, which is a polyeneyne under our definition. For purposes of brevity all these classes of compounds will be referred to herein as polyenes.

As used herein the term "reactive" unsaturated carbon-to-carbon groups means groups which will react under proper conditions as set forth herein with thiol groups to yield the thioether linkage

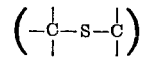

as contrasted to the term "unreactive" carbon-to-carbon unsaturation which means

groups when found in aromatic nuclei (cyclic structures exemplified by benzene, pyridine, anthracene, and the like) which do not under the same conditions react with thiols to give thioether linkages. In the instant invention, products from the reaction of polyenes having two or more reactive unsaturated carbon-to-carbon groups with polythiols which contain 2 or more thiol groups per average molecule are called poythioether polymers or polythioethers.

Methods of preparing various polyenes useful within the scope of this invention are disclosed in copending application having Ser. No. 674,773, filed Oct. 12, 1967, and assigned to the same assignee. Some of the useful polyenes are prepared in the detailed examples set forth in the following specification.

One group of polyenes operable in the instant invention is that taught in a copending application having Ser. No. 617,801, inventors: Kehr and Wszolek, filed: Feb. 23, 1967, and assigned to the same assignee. This group includes those having a molecular weight in the range of about 50 to 20,000, a viscosity ranging from 0 to 20 million centipoises between 20° C. and 130° C. of the general formula: $[A]-(X)_m$ wherein X is a member of the group consisting of

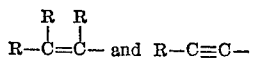

$m$ is at least 2; R is independently selected from the group consisting of hydrogen, halogen, and an organic compound selected from the group consisting of aryl, substituted aryl, cycloalkyl, substituted cycloalkyl, aralkyl, substituted aralkyl, alkyl, and substituted alkyl groups containing 1 to 16 carbon atoms; and A is a polyvalent organic moiety free of (1) reactive carbon-to-carbon unsaturation and (2) unsaturated groups in conjugation with the reactive ene or yne groups in X. Thus A may contain cyclic groupings and minor amounts of hetero atoms such as N, S, P or O but contains primarily carbon-carbon, carbon-oxygen, or silicon-oxygen containing chain linkages without any reactive carbon-to-carbon unsaturation.

In this first group, the polyenes are simple or complex species of alkenes or alkynes having a multiplicity of pendant, terminally or near terminally positioned "reactive" carbon-to-carbon unsaturated functional groups per average molecule. As used herein for determining the position of the reactive functional carbon-to-carbon unsaturation, the term "terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon-to-carbon unsaturation is located terminally or near terminally in a branch of the main chain as contrasted to a position at or near the end of the main chain. For purposes of brevity all of these positions will be referred to generally as "terminal" unsaturation.

The liquid polyenes operable in this first group contain one or more of the following types of nonaromatic and nonconjugated "reactive" carbon-to-carbon unsaturation:

(1) —CH=CH—

(2) —C≡C—

(3) —CH=CH₂

(4) —C≡CH

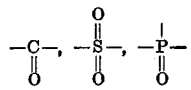

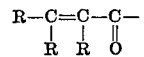

(7) —CH=C—

(8) —C=CH₂

These functional groups as shown in 1–8 supra are situated in a position either which is pendant, terminal or near terminal with respect to the main chain but are "free of terminal conjugation." As used herein the phrase "free of terminal conjugation" means that the terminal "reactive" unsaturated groupings may not be linked directly to non-reactive unsaturated species such as $$-\overset{O}{\underset{\|}{C}}-,\ -\overset{O}{\underset{\|}{\underset{O}{S}}}-,\ -\overset{|}{\underset{\|}{\underset{O}{P}}}-$$

and the like so as to form a conjugated system of unsaturated bonds exemplified by the structure:

$$\underset{R\ R\ O}{R-C=C-C-}$$

etc. On the average the polyenes must contain 2 or more "reactive" unsaturated carbon-to-carbon bonds per molecule and have a viscosity in the range from slightly above 0 to about 20 million centipoises between 20° C. and 130° C. Included in the term "polyenes" as used herein are those materials which in the presence of an inert solvent, aqueous dispersion or plasticizer fall within the viscosity range set out above between 20° C. and 130° C. Operable polyenes in the instant invention have a molecular weight in the range of about 50 to 20,000, or more, preferably about 300 to about 10,000.

Examples of operable polyenes from this first group include, but are not limited to:

(1) Crotyl-terminated polyurethanes which contain two "reactive" double bonds per average molecule in a near terminal position of the average general formula:

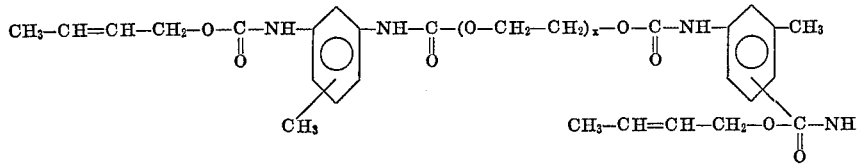

wherein x is at least 1.

(2) Ethylene/propylene/non-conjugated diene terpolymers, such as "Nordel 1040" manufactured by E. I. du Pont de Nemours & Co., Inc., which contains pendant "reactive" double bonds for the formula:

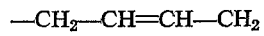

(3) The following structure which contains terminal "reactive" double bonds:

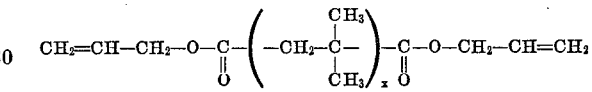

wherein x is at least 1.

(4) The following structure which contains near terminal "reactive" double bonds:

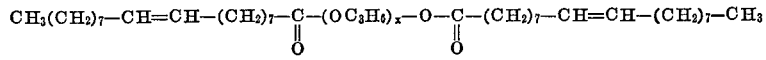

wherein x is at least 1.

Another group of operable polyenes includes those unsaturated polymers in which the double or triple bonds occur primarily within the main chain of the molecules. Examples include conventional elastomers (derived primarily from standard diene monomers such as polyisoprene, polybutadiene, styrene-butadiene rubber, isobutylene-isoprene rubber, polychloroprene, styrene-butadiene-acrylonitrile rubber and the like; and unsaturated polyesters, polyamides, and polyurethanes derived from monomers containing "reactive" unsaturation, e.g., adipic acid-butenediol condensation polymers and the like.

A third group of polyenes operable in this invention include those polyenes in which the reactive unsaturated carbon-to-carbon bonds are conjugated with adjacent unsaturated groupings. Examples of operable conjugated reactive ene systems include but are not limited to the following:

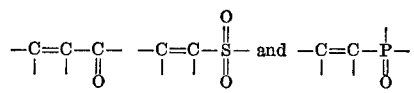

A fourth group of polyenes operable in this invention include those liquid polyenes (having a -ene or -yne functionality of at least two and having a viscosity in the range from 0 to 20 million centipoises between 20° C. and 130° C. and a molecular weight ranging from about 150 to 20,000 or more) which are formed by reacting either:

(A) An organic epoxide containing at least two

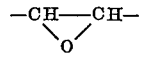

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or (B) An organic epoxide containing at least one organic substituent containing a reactive ethylenically or ethynylically unsaturated group with a member of the group consisting of hydrazine and an organic material containing at least two active hydrogen functions from the group consisting of

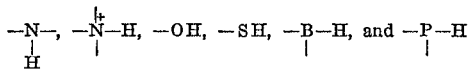

The novel polyenes produced by the instant invention can be used in combination with polythiols to form cured adhesive compositions.

As described herein the key chemical entity in the above described fourth group of polyenes is the oxirane group, namely,

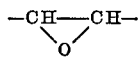

Novel liquid polyene compositions having a multiplicity of -ene or -yne functionality are prepared by the reaction of oxirane groups with ring-opening active hydrogen-containing species. This objective can be attained by two routes: (a) a di- or polyfunctional epoxy compound is reacted with an unsaturated active hydrogen-containing material and (b) di- or polyfunctional active hydrogen-containing compound is reacted with an unsaturated epoxy material.

A few typical examples of polymeric polyenes which contain conjugated reactive double bond groupings such as those described above are poly(oxyethylene) glycol (600 M.W.) diacrylate, poly(oxytetramethylene) glycol (1000 M.W.) dimethylacrylate; the triacrylate of the reaction product of trimethylol propane with 20 moles of ethylene oxide; and the like.

As used herein, the term "polythiols" refers to simple or complex organic compounds having a multiplicity of pendant or terminally positioned —SH functional groups per average molecule.

On the average the polythiols must contain 2 or more —SH groups per molecule. They usually have a viscosity range of slightly above 0 to about 20 million centipoises (cps.) between 20° C. and 130° C., as measured by a Brookfield Viscometer. Included in the term "polythiols" as used herein are those materials which in the presence of an inert solvent, aqueous dispersion or plasticizer fall within the viscosity range set out above (between 20° C. and 130° C.). Operable polythiols in the instant invention usually have molecular weights in the range of about 50 to about 20,000 or more, preferably about 300 to about 10,000. The polythiols operable in the instant invention can be exemplified by the general formula: $R_a$—$(SH)_n$ where $n$ is at least 2 and $R_a$ is polyvalent organic moiety free from "reactive" carbon-to-carbon unsaturation. Thus $R_a$ may contain cyclic groupings and minor amounts of hetero atoms such as N, S, P, or O but primarily contain carbon-hydrogen, carbon oxygen, or silicon-oxygen containing chain linkages free of any "reactive" carbon-to-carbon unsaturation.

One class of polythiols operable with polyenes in the instant invention to obtain essentially odorless cured polythioether printing plates are esters of thiol-containing acids of the general formula: HS—$R_b$—COOH where $R_b$ is an organic moiety containing no "reactive" carbon-to-carbon unsaturation with polyhydroxy compounds of the general structure: $R_c$—$(OH)_n$ where $R_c$ is an organic moiety containing no "reactive" carbon-to-carbon unsaturation and $n$ is 2 or greater. These components will react under suitable conditions to give a polythiol having the general structure:

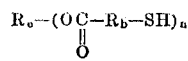

where $R_b$ and $R_c$ are organic moieties containing no "reactive" carbon-to-carbon unsaturation and $n$ is 2 or greater.

Certain polythiols such as the aliphatic monomeric polythiols (ethane dithiol, hexamethylene dithiol, decamethylene dithiol, tolylene-2,4-dithiol, etc.), some polymeric polythiols such as a thiol-terminated ethylcyclohexyl dimercaptan polymer, etc., and similar polythiols which are conveniently and ordinarily synthesized on a commercial basis, although having obnoxious odors, are operable in this invention. Examples of the polythiol compounds preferred for this invention because of their relatively low odor level and fast curing rate include but are not limited to esters of thioglycolic acid (HS—$CH_2$COOH), α-mercaptopropionic acid (HS—$CH(CH_3)$—COOH) and β-mercaptopropionic acid (HS—$CH_2CH_2$COOH) with polyhydroxy compounds such as glycols, triols, tetraols, pentaols, hexaols, etc. Specific examples of the preferred polythiols include but are not limited to ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate) and pentaerythritol tetrakis(β-mercaptopropionate), all of which are commercially available. A specific example of a preferred polymeric polythiol is polypropylene ether glycol bis(β-mercaptopropionate) which is prepared from polypropyleneether glycol (e.g., Pluracol P2010, Wyandotte Chemical Corp.) and β-mercaptopropionic acid by esterification.

The preferred polythiol compounds are characterized by a low level of mercaptan-like odor initially, and after reaction give essentially odorless cured polythioether end products which are commercially useful resins or elastomers for printing plates.

As used herein the term "odorless" means the substantial absence of the well-known offensive and sometimes obnoxious odors that are characteristic of hydrogen sulfide and the derivative family of compounds known as mercaptans.

The term "functionality" as used herein refers to the average number of ene or thiol groups per molecule in the polyene or polythiol, respectively. For example, a triene is a polyene with an average of three "reactive" carbon-to-carbon unsaturated groups per molecule and thus has a functionality ($f$) of three. A dithiol is a polythiol with an average of two thiol groups per molecule and thus has a functionality ($f$) of two.

It is further understood and implied in the above definitions that in these systems the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100 percent of the theoretical value for complete reaction, the functionality (assuming 100 percent pure starting materials) would be 2.0. If, however, the reaction were carried to only 95 percent of theory for complete reaction, aobut 10 percent of the molecules present would have only one ene functional group, and there may be a trace of material that would have no ene functional group at all. Approximately 90 percent of the molecules, however, would have the desired diene structure and the product as a whole then would have an actual functionality of 1.9. Such a product is useful in the instant invention and is referred to herein as having a functionality of 2.

The aforesaid polyenes and polythiols can, if desired, be formed or generated in situ and still fall within the scope of the instant invention.

To obtain the maximum strength, solvent resistance, creep resistance, heat resistance and freedom from tackiness, the reaction components consisting of the polyenes and polythiols of this invention generally are formulated in such a manner as to give solid, crosslinked, three dimensional network polythioether polymer systems on curing. In this invention the individual polyenes and polythiols must each have a functionality of at least 2, and the sum of the functionalities of the polyene and polythiol components must always be at least and preferably greater than 4. Blends and mixtures of the polyenes and the polythiols containing said functionality are also operable herein.

In general, it is preferred, especially at our near to operable lower limits of functionality in the polyene and polythiol, to use the polythiol and the polyene compounds in such amounts that there is one thiol group present for each double bond, it being understood that the total functionality of the system must be at least four (preferably greater than four) and the functionality of the thiol and the diene must each be at least two. For example, if two moles of a triene are used, and a dithiol is used as the curing agent, making the total functionality have a value of five, it is preferable to use three moles of the dithiol. If much less than this amount of this amount of the thiol is used, the curing rate will be lower and the product will be weaker because of the reduced crosslink density. If much more than the stoichiometric amount of the thiol is used, the rate of cure may be higher, if that is desirable, although excessive amounts can lead to a plasticized crosslinked product which may not have the desired properties. However, it is within the scope of this invention to adjust the relative amounts of polyenes and polythiols to any values above the minimum scope disclosed herein which give desirable properties to the crosslinked polythioether.

The photocurable element should be exposed to ultraviolet radiation. For example, actinic radiation (or sunlight) containing a substantial amount of ultraviolet radiation can be used to expose the photocurable element until substantial photocuring takes place in the exposed areas.

The photocuring reaction can be initiated by U.V. (ultraviolet) radiation contained in actinic radiation obtained from sunlight or obtained from special light sources which emit significant amounts of U.V. light. Thus it is possible merely to expose the polyene and polythiol admixture to actinic radiation containing substantial amounts of U.V. radiation under ambient conditions or otherwise and obtain a cured solid elastomeric or resinous product useful as a reinforced composite structure production material. But this approach to the problem at times results in extremely long exposure times which causes the process in the vast bulk of applications to be commercially unfeasible. Chemical photocuring rate accelerators (photoinitiators or sensitizers or activators) serve to drastically reduce the exposure times and thereby when used in conjunction with various forms of energetic radiation (e.g., containing U.V. radiation) yield very rapid, commercially practical cures by the practice of the instant invention. Useful photocuring rate accelerators include benzophenone, acetophenone; acenaphthene - quinone; methyl ethyl ketone; thioxanthen - 9 - one; xanthen - 9- one; 7 - H - benz[de] anthracen - 7 - one; dibenzosubernone; 1 - naphthaldehyde; 4,4 - bis(di - methylamino) benzophenone; fluorene - 9 - one; 1' - acetonaphthone; 2' - acetonaphthone; 2,3 - butanedione; anthraquinone, 1-indanone; 2 - tert - butyl anthraquinone; calerophenone; hexanophenone; 8 - phenylbutyrophenone; p - morpholinopropiophenone; 4 - morpholinobenzophenone; 4'-morpholinodesoxybenzoin; p-diacetylbenzene; 4 - aminobenzophenone; 4' - methoxyacetophenone; benzaldehyde; α-tetralone; 9 - acetylphenanthrene; 2 - acetylphenanthrene; 10-thioxanthenone; 3-acetylphenanthrene; 3-acetylindole, 1,3,5-triacetylbenzene; etc., and blends thereof. The photocuring rate accelerator is added in an amount ranging from about zero (e.g., 0.0005) to about 30 percent by weight of the polyene and polythiol components in the instant invention. Benzophenone is the preferred photocuring rate accelerator. The above discussion generally applies to electron beam radiation and gamma radiation. Useful U.V. radiation has a wave length in the range of about 2000 to 4000 angstrom units.

The photocurable compositions to be photocured, in accord with the present invention may, if desired, include such additives as natural or synthetic resins, antioxidants, dyes, inhibitors, activators, fillers, pigments, antistatic agents, flame-retardant agents, thickeners, thixotropic agents, surface-active agents, light scattering agents, viscosity modifiers, extending oils, plasticizers, tackifiers and the like within the scope of this invention. Such additives are usually preblended with the polyene or polythiol prior to or during the compounding step although they can optionally be added via the porous support layer. As is the case with any material which is added to the photocurable polymer composition useful within the scope of this invention, one should take care that it does not affect the photocuring characteristics of the photocurable composition in a manner which is undesired. Operable fillers include natural and synthetic resins, carbon black, glass fibers, wood flour, clay, alumina, carbonates, oxides, e.g., $TiO_2$, hydroxides, silicates, glass flakes, glass beads, borates, phosphates, diatomaceous earth, calcium sulfate, a calcium carbonate, antimony oxide, colloidal carbon, titanium dioxide, various colored pigments, various organophilic silicas, powdered glass, and the like. The aforesaid additives may be present in quantities up to 500 parts or more per 100 parts photocurable composition by weight and preferably 0.0005 to 300 parts on the same basis.

The compounding of the components prior to curing can be carried out in several ways. One useful method of compounding is to prepare by conventional mixing techniques (but in the absence of actinic radiation) a composition consisting of polyene, polythiol, optionally a photocuring rate accelerator, and other inert additives. This composition generally can be stored in the dark for extended periods of time. It could be charged to an aerosol can, drum, tube, or cartridge for subsequent use.

Conventional antioxidants, curing inhibitors or retarders operable in the instant invention include but are not limited to hydroquinone, p-tert-butyl catechol, 2,6-ditert-butyl-p-methylphenol, phenothiazine, and N-phenyl-2-naphthylamine. The majority of the commercially available monomers and polymers used in the photocurable compositions normally contain minor amounts (about 50 to 5000 parts per million by weight) of inhibitors to prevent spontaneous polymerization prior to use. The presence of these inhibitors in optimum amounts causes no undesirable results in the photocurable layer of this invention.

The molecular weight of the polyenes of the instant invention can be measured by various conventional methods including solution viscosity, osmotic pressure and gel permeation chromatography. Additionally, the molecular weight can be sometimes calculated from the known molecular weight of the reactants. The viscosity of the polyenes and polythiols was measured on a Brookfield Viscometer at 20° C. or 130° C. in accord with the instructions thereof.

The photocurable composition is a liquid, but includes a gel or elastomeric state. The photocurable composition may also contain a thickening agent to increase the viscosity of the photocurable liquid polymer. For example, cellulosic derivatives, finely divided silicas and finely ground fibrous asbestos materials may be used. The preferred photocurable compositions of the instant invention have viscosities in the range of about 0.25 to about 3500 poises and above and preferably from about 5 to about 150 poises at or below 130° C.

After the photocurable composition has been absorbed into and onto one or both surfaces of the porous support layer, an outer layer (transparent or opaque) can be placed on one or both of the surfaces of the porous support layer. This invention is broad enough to cover that embodiment where an outer layer containing pigments or which are opaque (to U.V. radiation) is placed on the support layer to serve as U.V. blocking layers until actual use or until exposure of the support layer. This would allow storage in non-darkened areas for extended times. Suitable high polymer films include: polyolefins; polyamides, i.e., polyhexamethylene sebacamide and polyhexamethylene adipamide; polyethylene; polypropylene; polyesters, i.e., polyethylene terephthalate and polyethylene terephthalate/isophthalate copolymers; vinyl acetals; vinylidene chloride copolymerized with vinyl chloride, styrene and acrylonitrile; cellulose acetate; cellulose acetate/butyrate; viscose rayon; etc. In addition, the outer layer, especially the top cover, may also be a glass or sime-transparent paper. It is not important that the top cover be particularly rigid, in fact, a flexible top cover is often preferred. A release agent, e.g., paraffin, silicone oil, etc., can be placed on the surface of the outer layer which contacts the porous support layer.

It is important to select the correct exposure time in the photocuring process of this invention. Aside from exposure time and light intensity, the extent of the exposure is dependent of the depth of the photocurable composition impregnated in the porous support layer, the curing temperature, the structure and functionality of the polyene and polythiol employed, the photoinitiator type and concentration, the photocuring rate, and the presence of light absorbing pigments dyes or other additives in the photocurable composition. In general, the deeper the photocurable composition is impregnated, the longer the exposure time. It has been observed that photocuring starts at the surface of the photocurable composition closest to the light source and proceeds inward. With insufficient exposure, the photocurable composition may have a hard photocure at the surface but, through lack of a clear-through photocure, not be sufficiently photocured throughout the support layer. Inasmuch as the photocuring rate usually increases at higher temperatures, less exposure is required thereat than at room temperature. Thus ultraviolet light sources that emit heat, or the concurrent use of an infrared lamp with the U.V. lamps, etc., are generally more efficient than cold ultraviolet light sources. Hence, it is preferred that the photocuring be carried out at a temperature in the range of about 20° to about 130° C. Exposure may optionally be made simultaneously from both sides of the photocurable element by using a multiplicity of actinic light sources. Due to the number of variables which affect exposure time, optimum results are best determined by trial and error, e.g., stepped exposures with characterization after each exposure.

Various light sources can be used to obtain sufficient U.V. light to practice the instant invention. Such sources obviously include natural sunlight but also include carbon arcs, mercury arcs, fluorescent lamps with special ultraviolet light emitting phosphors, xenon arcs, argon glow lamps, and photographic flood lamps. Of these, the mercury vapor arcs, particularly the sunlamp type, and the xenon arcs are very useful. The sunlamp mercury vapor arcs are customarily used at a distance of 7 to 10 inches from the photocurable layer, whereas the xenon arc is placed at a distance of 24 to 40 inches from the photocurable layer. With a more uniform extended source of low intrinsic brilliance, such as a group of contiguous fluorescent lamps with special phosphors, the plate can be exposed within an inch of the lamps. The time required for exposure will range from a few seconds to several hours or more depending on the thickness of the photocurable element, the intensity of the exposing radiation and the inherent photocuring rate of the composition, etc.

The photocurable compositions, can be used in organic solvent solutions at both low and high total solids contents, or can be used as solutions, dispersions or emulsions in aqueous media.

The photocurable liquid compositions of the instant invention prior to photocuring can readily be pumped, poured, siphoned, brushed, sprayed, doctored, rolled, trowelled, dipcoated, extruded, gunned, and so forth onto the surface of the porous support layer (so that it can be absorbed therein).

The liquid polythioether photocurable components and compositions in the instant invention can, prior to curing, be admixed with or blended with other monomeric and polymeric materials, such as thermoplastic resins, elastomers, or thermosetting resin monomers or polymeric compositions.

The advantage of this invention is that reinforced composite sheet structures can be prepared which have improved mechanical and electrical properties and are resistant to moisture. The photocurable elements of this invention can be stored in a dark area for long periods of time (several weeks to a year or more, depending on the formulation, type of antioxidant or stabilizer used, etc.) before exposure. Also, rigid sheets can be produced from flexible sheets by this invention.

The fiber-reinforced composite structures described in the following examples are especially useful for applications in which it is desired to convert flexible, single-component laminates or layups into shaped rigid structures. Making the structure rigid can be accomplished rapidly, conveniently and economically under essentially ambient conditions without the need for complex fabrication equipment, heating ovens, molds and the like. In addition to on-site erection of portable or temporary houses, domes, shelters, etc. (of Examples 37, 38), it is possible to prepare containers of various dimensions and shapes, including pails, vats, drums and tanks; simple or complex spiral-wound tubes, pipes or cylinders; boat hulls; aircraft fuselages; houshold or industrial appliances; auto bodies or segments thereof; furniture; water, solvent or corrosion resistant liners or coverings for structures made primarily from wood or metallic members; outdoor temporary or permanent floorings such as for patios, athletic courts, aircraft landing strips, roads, etc. In summary, the processes and products of this invention can be used generally in almost any application area now served by conventional heat-cured two-component fiber reinforced composites, but with considerable advantages in storage stability, shipping and handling, fabrication economies and convenience.

Further, the technique of laying up a filament wound reinforced composite structure which is then rigidized by exposure to actinic radiation is also possible by suitable and obvious modifications of existing filament winding techniques.

The following examples will aid in explaining, but should not be deemed by limiting, the instant invention. In all cases, unless otherwise noted, all parts and percentages are by weight.

EXAMPLE 1

3456.3 gm. (1.75 moles) of poly(propyleneether) glycol, commercially available under the trade name "PPG 2025" from Union Carbide, and 1.7 gm. of di-n-butyl tin dilaurate were placed in a 5-liter, round-bottom, 3-neck flask. The mixture in the flask was degassed at 110° C. for one hour and was then cooled at 25° C. by means of an external water bath. 207 gm. (3.50 moles) of allyl alcohol, with stirring, was added to the flask. 609.0 gm. (3.50 moles) of an 80–20 percent isomer mixture of tolylene-2,4-diisocyanate and tolylene-2,6-diisocyanate, respectively, sold under the trade name "Mondur TD 80," was charged to the flask. The mixture was stirred well. The flask was cooled by the water bath during this period. Six minutes after the "Mondur TD 80" was added, the temperature of the mixture was 59° C. After 20 minutes, the NCO content was 12.39 mg. NCO/gm.; after 45 minutes, it was 9.87 mg. NCO/gm.; and after 75 minutes, it was 6.72 mg. NCO/gm. The water bath was removed 80 minutes after the "Mondur TD 80" had been added, the temperature was maintained. 105 minutes after the "Mondur TD 80" was added, the NCO content was 3.58 mg. NCO/gm.; after 135 minutes, it was 1.13 mg. NCO/gm.; after 150 minutes, it was 1.13 mg. NCO/gm.; and after 195 minutes, it was 0.42 mg. NCO/gm. At that point in time, the resultant polymer composition was heated to 70° C., and vacuum-stripped for one hour. The resultant polymer composition was labeled composition 1, and had a viscosity of 16,000 cps. as measured on a Brookfield Viscometer at 30 °C. Unless otherwise stated, all the viscosity measurements were made on a Brookfield Viscometer at 30° C.

The above procedure was repeated five times, and resultant compositions were labeled compositions 2 to 6, respectively. The heating step lasted 180 minutes, 140 minutes, 205 minutes and 180 minutes, respectively. With composition 2, the temperature was 60° C. after 8 minutes; with composition 3, the temperature was 57° C. after 6 minutes; with composition 4, the temperature was 41° C. after 20 minutes, at which time the temperature was raised and held at 60° C.; with composition 5, the temperature was 57.5° C. in 8 minutes, was 42° C. in 40 minutes, then taken up to 60° C. and lowered to 58° C. after 120 minutes; and with composition 6, the temperature was 57° C. in 6 minutes, and 41° C. after 60 minutes, at which time the temperature was immediately raised to 60° C. The viscosity of the resultant polymer compositions was 15,500 cps.; 16,000 cps., 17,000 cps.; and 16,800 cps., respectively.

Compositions 1, 2, 3, 4, 5 and 6 were placed in a 6 gallon container and stirred well. The resultant polymer composition had a viscosity of 16,600 cps. and the NCO content was 0.01 mg. NCO/gm. This composite polymer was labeled polymer A.

100 parts by weight of polymer A, 10 parts by weight of polythiol A and 0.5 part by weight of benzophenone were admixed. This resulted in photocurable composition A. Polythiol A was pentaerythritol tetrakis ($\beta$-mercaptopropionate), which is commercially available under the trade name "Q–43 Ester" (sold by Carlisle Chemical Company). Photocurable composition A was dissolved in an equal weight of methyl ethyl ketone (serving as a solvent) and used to impregnate a lightweight paper (Seafoam bond). The excess photocurable composition solution was wiped off the surface of the paper (porous support layer). The solvent was removed by hanging the impregnated paper in a forced draught oven (at 35° C.) for 120 minutes. The impregnated paper was irradiated (exposed) with U.V. light from a Westinghouse sunlamp (Model No. RS 275 watt) at a distance of 12 inches for 2 minutes. The exposed photocurable composition had photocured to a rubbery material in the paper. The resultant impregnated paper was translucent, mechanically strong and water resistant.

EXAMPLE 2

Example 1 was repeated, except that the porous support layer was a sheet of newsprint paper. The exposed photocurable composition had photocured to a rubbery material in the paper. The resultant impregnated paper was translucent, mechanically strong and water resistant.

EXAMPLE 3

Example 1 was repeated, except that the porous support layer was a sheet of coarse porosity paper (Whatman Grade 541). The exposed photocurable composition had photocured to a rubbery material in the paper. The resultant impregnated paper was translucent, mechanically strong and water resistant.

EXAMPLE 4

Example 1 was repeated, except that the porous support layer was a sheet of fine porosity paper (Whatman Grade 50). Exposure was made with two sunlamps positioned on both sides of the photocurable element. The exposed photocurable composition had photocured to a rubbery material in the paper. The resultant impregnated paper was translucent, mechanically strong and water resistant.

EXAMPLE 5

Example 1 was repeated, except that the porous support layer was a sheet of tightly woven cloth (cotton). The exposed photocurable composition had photocured to a rubbery material in the fabric. The resultant impregnated fabric was translucent, mechanically strong and water resistant.

EXAMPLE 6

Example 1 was repeated, except that the porous support layer was a sheet of tightly compacted hemp fibers. The exposed photocurable composition had photocured to a rubbery material in the web. The resultant impregnated web was translucent, mechanically strong and water resistant.

EXAMPLE 7

Example 1 was repeated, except that the porous support layer was a sheet of tightly compacted nylon fibers (non-woven). The exposed photocurable composition had photocured to a rubbery material in the fabric. The resultant impregnated non-woven web was transparent, mechanically strong and water resistant.

EXAMPLE 8

Example 1 was repeated, except that the porous support layer was a sheet of microporous, filled polyethylene, available from the Dewey and Almy Division of W. R. Grace & Co. under the trade name Darmic. The exposed photocurable composition had photocured to a rubbery material in the porous sheet. The resultant impregnated sheet was transparent, mechanically strong and water resistant.

EXAMPLE 9

Example 1 was repeated, except that the porous support layer was a sheet of 75 parts of glass fibers and 25 parts of asbestos fibers along with a small amount of resinous binders (the fibers being tightly compacted). The exposed photocurable composition had photocured to a rubbery material in the sheet. The resultant impregnated fibrous sheet was transparent, mechanically strong and water resistant.

EXAMPLE 10

Example 1 was repeated, except that 15 parts of trimethylolpropane tris(thioglycolate) was used in place of pentaerythritol tetrakis ($\beta$-mercaptopropionate). The exposed photocurable composition had photocured to a rubbery material in the paper. The resultant impregnated paper was translucent, mechanically strong and water resistant.

EXAMPLE 11

Example 1 was repeated, except that 10 parts of pentaerythritol tetrakis (thioglycolate) was used in place of pentaerythritol tetrakis ($\beta$-mercaptopropionate). The exposed photocurable composition had photocured to a rubbery material in the paper. The resultant impregnated paper was translucent, mechanically strong and water resistant.

EXAMPLE 12

Example 1 was repeated, except that half of the pentaerythritol tetrakis ($\beta$-mercaptopropionate) was replaced with 5 parts of ethylene glycol bis ($\beta$-mercaptopropionate). The exposed photocurable composition had photocured to a rubbery material in the paper. The resultant impregnated paper was translucent, mechanically strong and water resistant.

EXAMPLE 13

Example 1 was repeated, except that 2 parts of cyclohexanone was used as the photocuring rate accelerator in place of benzophenone. The exposed photocurable composition had photocured to a rubbery material in the paper. The resultant impregnated paper was translucent, mechanically strong and water resistant.

EXAMPLE 14

Example 1 was repeated, except that 1.5 parts of dibenzosuberone was used as the photocuring rate accelerator in place of benzophenone. The exposed photocurable composition had photocured to a rubbery material in the paper. The resultant impregnated paper was translucent, mechanically strong and water resistant.

EXAMPLE 15

Example 1 was repeated, except that the impregnated paper was stored in a dark room for one month before it was exposed to U.V. light. The exposed photocurable composition had photocured to a rubbery material in the paper. The resultant impregnated paper was translucent, mechanically strong and water resistant.

EXAMPLE 16

Example 1 was repeated except that 3.0 parts of acetophenone was used as the photocuring rate accelerator in place of benzophenone. The exposed photocurable composition had photocured to a rubbery material in the paper. The resultant impregnated paper was translucent, mechanically strong and water resistant.

EXAMPLE 17

Example 1 was repeated except that 1.5 parts of methyl ethyl ketone was used as the photocuring rate accelerator in place of benzophenone. The exposed photocurable composition had photocured to a rubbery material in the paper. The resultant impregnated paper was translucent, mechanically strong and water resistant.

EXAMPLE 18

Example 1 was repeated except that 80 parts of polymer B was used in place of polymer A. Polymer B was prepared as follows: 600 gm. (0.22 mole) of a polypropylene glycol, having a molecular weight of 2960 and under the trade name "Triol 3000" by Union Carbide Corp., was charged to a 1-liter resin kettle along with 0.3 gm. of dibutyl tin dilaurate. The kettle was heated to 110° C. under vacuum and maintained thereat for one hour. The kettle was cooled to 60° C. whereat 40 gm. (0.48 mole) of allyl isocyanate was added dropwise from a dropping funnel to the reaction mixture. After 20 minutes the NCO content was 0.80 mg. NCO/gm. The thus formed prepolymer was then maintained under vacuum at 70° C. for 1 hour followed by 2 hours at 90° C. This allyl-terminated polymer was labeled polymer B. The exposed photocurable composition had photocured to a rubbery material in the paper. The resultant impregnated paper was translucent, mechanically strong and water resistant.

EXAMPLE 19

Example 3 was repeated except that 100 parts of polymer C was used in place of polymer A. Polymer C was prepared as follows: 300 gm. (0.097 mole) of a commercially available linear solid polyester diol, sold under the trade name "S-108" by Hooker Chemical Co., along with 0.1 cc. of dibutyl tin dilaurate were charged to a 1-liter four-necked flask equipped with stirrer. The mixture was heated to 110° C. under vacuum and nitrogen and maintained thereat for 1 hour. The mixture was then cooled at 60° C. whereat 16 gm. of allyl isocyanate was added and the mixture was heated to 75° C. with stirring and maintained thereat for 1 hour at a temperature in the range 70°–80° C. This allyl-terminated polymer was labeled polymer C. The exposed photocurable composition had photocured to a rubbery material in the paper. The resultant impregnated paper was translucent, mechanically strong and water resistant.

EXAMPLE 20

Example 1 was repeated except that 133 parts of polymer D was used in place of polymer A. Polymer D was prepared as follows: 600 gm. (0.11 mole) of a polypropylene glycol, called under the trade name "Triol 6000" by Union Carbide Corp., was charged to a 1-liter resin kettle along with 0.3 gm. of dibutyl tin dilaurate. The kettle was heated to 110° C. under vacuum and maintained thereat for 1 hour. The kettle was then cooled to approximately 50° C. whereat 28.4 gm. (0.342 mole) of allyl isocyanate was added slowly to keep the exotherm between 60°–67° C. NCO content after 20 minutes was 0.62 mg. NCO/gm. This polymer was then placed under vacuum at 70° C. for 1 hour followed by an additional vacuuming at 90° C. for 2 hours. This allyl-terminated polymer was labeled polymer D. The exposed photocurable composition had photocured to a rubbery material in the paper. The resultant impregnated paper was translucent, mechanically strong and water resistant.

EXAMPLE 21

Example 1 was repeated except that 90 parts of polymer E was used in place of polymer A. Polymer E was prepared as follows: 240 gm. (0.12 mole) of a polyether diol, i.e., poly(tetramethylene ether) glycol, having a molecular weight of 1990 and commercially available from the Quaker Oats Co. under the trade name "Polymeg 1990" were charged to a 500 ml. three-necked flask equipped with a stirrer. The flask was heated to 110° C. under vacuum and nitrogen and maintained thereat for 1 hour. The flask was then cooled to approximately 70° C. whereat 0.1 cc. of dibutyl tin dilaurate along with 14 gm. (0.25 mole) of allyl alcohol were added to the flask and stirring was continued for 15 minutes. Thereafter 42 gm. (0.24 mole) of tolylene diisocyanate (molecular weight 174), commercially available from Mobay Chemical Co. under the trade name "Modur TD 80," was added to the flask by means of a dropping funnel and the reaction was continued with stirring for 1 hour. This allyl-terminated polymer was labeled polymer E. The exposed photocurable composition had photocured to a rubbery material in the paper. The resultant impregnated paper was translucent, mechanically strong and water resistant.

EXAMPLE 22

Example 1 was repeated except that 150 parts of polymer F was used in place of polymer A. Polymer F was prepared as follows: 1500 gm. (0.47 mole) of a linear solid polyester diol, having a molecular weight of 3200 and commercially available from Hooker Chemical Corp. under the trade name "Rucoflex S–1011–35," was charged to a 3-liter, 3-necked flask and heated to 110° C. under vacuum and nitrogen for 1 hour with stirring. 83 gm. of allyl isocyanate, having a molecular weight of 83.1 and commercially available from Upjohn Co., was added to the flask along with 0.3 cc. of dibutyl tin dilaurate (catalyst, commercially available from J. T. Baker and Co. The reaction was continued at 110° C. with stirring for 1 hour. This allyl-terminated polymer was labeled polymer F. The exposed photocurable composition had photocured to a rubbery material in the paper. The resultant impregnated paper was translucent, mechanically strong and water resistant.

EXAMPLE 23

Example 1 was repeated except that 118 parts of polymer G was used in place of polymer A. Polymer G was prepared as follows: To a 1-liter resin kettle equipped with stirrer, thermometer, gas inlet and outlet and heated to a temperature of 50° C. was charged 610 gm. (0.2 mole) of polytetramethylene ether glycol, commercially available from Quaker Oats Co. and having a hydroxyl number of 37.1 and a molecular weight of 3000, along with 0.3 gm. dibutyl tin dilaurate. The temperature of the kettle was raised to 110° C. and the contents were freed of water under 1 millimeter vacuum for 1 hour. The resin kettle was cooled to 60° C. and the system was placed under a protective atmosphere of nitrogen throughout the remainder of the reaction. 34.0 gm. of allyl isocyanate (0.4 mole) was added dropwise to the kettle at such a rate as to maintain the temperature of 60° C. When the NCO content dropped to 0.54 mg./gm., 1 mm. vacuum again was applied and the system was heated at 70° C. for one hour. The thus formed polymer product was a solid at room temperature but at 50° C. is clear and pourable. The polymer product has a viscosity of 1800 centipoises at 70° C. as measured on a Brookfield Viscometer and an average molecular weight of approximately 3200 and was labeled polymer G. The exposed photocurable composition had photocured to a rubbery material in the paper. The resultant impregnated paper was translucent, mechanically strong and water resistant.

EXAMPLE 24

Example 1 was repeated except that 70 parts of polymer H was used in place of polymer A. Polymer H was prepared as follows: 458 gm. (0.23 mole) of a commercially available liquid polymeric diisocyanate, sold under the trade name "Adiprene L–100" by E. I. du Pont de Nemours & Co., Inc. was charged to a dry resin kettle maintained under a nitrogen atmosphere and equipped with a condenser, stirrer, thermometer, and gas inlet and outlet. 37.8 gm. (0.65 mole) of allyl alcohol was charged to the kettle and the reaction was continued for 17 hours with stirring at 100° C. Thereafter the nitrogen atmosphere was removed and the kettle was evacuated 8 hours at 100° C. 50 cc. of dry benzene was added to the kettle and the reaction product was azeotroped with benzene to remove the unreacted alcohol. This allyl-terminated liquid polymer had a molecular weight of approximately 2100, and was labeled polymer H. The exposed photocurable composition had photocured to a rubbery material in the paper. The resultant impregnated paper was translucent, mechanically strong and water resistant.

EXAMPLE 25

Example 1 was repeated except that 110 parts of polymer I was used in place of polymer A. Polymer I was prepared as follows: 1 mole of commercially available polyethylene glycol having a molecular weight of 1450 and a specific gravity of 1.21 was charged to a resin kettle maintained under nitrogen and equipped with a condenser, stirrer, thermometer, and a gas inlet and outlet. 2.9 gm. of dibutyl tin dilaurate as a catalyst was charged to the kettle along with 2 moles of tolylene-2,4-diisocyanate and 2 moles of allyl alcohol. The reaction was continued with stirring at 60° C. for 2 hours. Thereafter a vacuum of 1 mm. was applied for 2 hours at 60° C. to remove the traces of excess alcohol. This $CH_2=CH-$ terminated polymer had a molecular weight of approximately 1950 and was labeled polymer I. The exposed photocurable composition had photocured to a rubbery material in the paper. The resultant impregnated paper was translucent, mechanically strong and water resistant.

EXAMPLE 26

Example 1 was repeated except that an equal amount of photocurable composition B was used in place of photocurable composition A. 67 gm. of pentaerythritol tetrakis ($\beta$-mecaptopropionate); 33 gm. of the reaction product of one mole of allyl isocyanate with one mole of diallyl amine; and 0.5 gm. of benzophenone were thoroughly admixed to prepared photocurable composition B. The exposed photocurable composition had photocured to a rubbery material in the paper. The resultant impregnated paper was translucent, mechanically strong and water resistant. This example illustrates the use of a monomeric polythiol and a monomeric polyene in the preparation of a photocurable composition.

EXAMPLE 27

Example 1 was repeated except that an equal amount of photocurable composition C was used in place of photocurable composition A. 27 gm. of the triacrylate of the reaction product of one mole of trimethylol propane with 20 moles of ethylene oxide, 9 gm. of pentaerythritol tetrakis ($\beta$-mercaptopropionate), and 0.5 gm. of benzophenone were admixed to prepare photocurable composition C. This example illustrates the use of a polyene having a reactive ene group conjugated with another double bond grouping ($C=O$).

EXAMPLE 28

Example 1 was repeated except that an equal amount of photocurable composition D was used in place of photocurable composition A. 50 gm. of a liquid polybutadiene derivative having a molecular weight of 2200 and a double bond distribution consisting of about 60% trans-1,4; about 20% cis-1,4; and about 20% vinyl-1,2 (commerically available under the trade name "poly B–D–R–45M"); 5 gm. of pentaerythritol tretrakis ($\beta$-mercaptopropionate); 0.5 gm. of benzophenone were admixed to prepare photocurable composition D. The exposed photocurable composition had photocured to a rubbery material in the paper. The resultant impregnated paper was translucent, mechanically strong and water resistant.

EXAMPLE 29

Example 1 was repeated except that an equal amount of photocurable composition E was used in place of photocurable composition A. 10 gm. of Gentro 1002 (which is the trade name for a solid SBR rubber which is commercially available from General Tire and Rubber Co.), which was dissolved in 50 gm. of Decalin (as a solvent), 1 gm. of pentaerythritol tetrakis ($\beta$-mercaptopropionate), 0.5 gm. of benzophenone, and 0.1 gm. of silica ("Hi-Sil 233"), added as a thickening agent, were admixed to prepare photocurable composition E. The exposed photocurable composition had photocured to a rubbery material in the paper. The resultant impregnated paper was translucent, mechanically strong and water resistant.

EXAMPLE 30

Example 1 was repeated except that an equal amount of photocurable composition F was used in place of photocurable composition A. 50 gm. of "Dion Polymercaptan Resin DPM–1002," which is commercailly available from Diamond Alkali Co., and is a thiol terminated liquid polymer having a functionality of 2 and 3 and a molecular weight of about 5000; 2.5 gm. of triallyl cyanurate; and 0.5 gm. of benzophenone were admixed to prepare photocurable composition F. The exposed photocurable composition had photocured to a rubbery material in the paper. The resultant impregnated paper was translucent, mechanically strong and water resistant. This example illustrated the use of a photocurable composition containing a monomeric polyene and a polymeric polythiol.

EXAMPLE 31

Example 1 was repeated except that an equal amount of photocurable composition G was used in place of photocurable composition A. 100 parts of the polymeric polyene used in Example 19; 60 gm. of the polymeric polythiol used in Example 30; and 0.5 gm. of benzophenone were admixed to prepare photocurable composition G. The exposed photocurable composition had photocured to a rubbery material in the paper. The resultant impregnated paper was translucent, mechanically strong and water resistant.

EXAMPLE 32

Example 1 was repeated, except that the support layer was a non-woven sheet of polyethylene fibers. The exposed photocurable composition had photocured to a rubbery material in the web. The resultant impregnated paper was transparent, mechanically strong and water resistant.

EXAMPLE 33

Example 1 was repeated, except that the solvent used was ethylene glycol monoethyl ether acetate. The exposed photocurable composition had photocured to a rubbery material in the paper. The resultant impregnated paper was translucent, mechanically strong and water resistant.

EXAMPLE 34

Example 1 was repeated in the preparation of the photocurable sheet. Flexible cover layers which were darkened (essentially impervious to the passage of U.V. light) were roller applied with light pressure on each side of the photocurable element. The laminated element was stored for two days in a lighted room. Both cover layers were removed and the photocurable composition was found to be uncured. The element was exposed as in Example 1. The exposed photocurable composition had photocured to a rubbery material in the paper. The resultant impregnated paper was translucent, mechanically strong and water resistant.

EXAMPLE 35

Example 1 was repeated, except that 3-acetylphenanthrene was used in place of benzophenone. The exposed photocurable composition had photocured to a rubbery material in the paper. The resultant impregnated paper was translucent, mechanically strong and water resistant.

EXAMPLE 36

Example 35 was repeated, except that the flexible cover layer was comprised of clear, unpigmented low density polyethylene film having a thickness of about 0.75 mil. The element was stored in the dark prior to use. The cover layers permitted easy handling in the photocurable element without feeling any tackiness from the liquid photocurable composition. Exposure was made without removal of the cover films which were essentially transparent to U.V. light. The resultant polyethylene covered impregnated paper containing the photocured rubbery polythioether was translucent, mechanically strong and water resistant.

EXAMPLE 37

A layer of tightly woven cloth (cotton) was impregnated with the photocurable composition of Example 1. The layer of impregnated cloth was layered over a structure of poles arranged to form a lean-to. The layer of impregnated cloth was exposed to sunlight for about 20 minutes. The resultant photocured layer formed a rigid, water resistant cover for the lean-to.

EXAMPLE 38

A layer of microporous, filled polyethylene (hemisphere shaped) was impregnated with the photocurable composition of Example 1. The edges were weighted down and it was inflated by means of air pressure. The inflated hemisphere was exposed to sunlight for about 20 minutes. The resultant photocured structure formed a rigid, water-resistant structure. [Entrances and vents were readily cut in the structure.]

EXAMPLES 39 THROUGH 44

Polymer J was prepared as follows: One mole of Epon 828 and two moles of diallyl amine were placed in a beaker at room temperature. The reaction was continued with stirring for 18 hours during which time the exotherm and reaction temperature was maintained below 80° C. Resultant polymer J was liquid in form.

7 gm. of an admixture of polymer J, Q–43 and dibenzophenone (see Table I for the composition) were coated on the various fabrics given in Table I. The polymer was situated on and around the strands or in the porous mat, whatever the specific case. Each sample was matted between two 6-mil thick polyethylene layers. The impregnated fabrics were photocured with a U.V. lamp (4000 $\mu$w./in.$^2$) for 5 minutes. The test results are given in Table I.

EXAMPLES 45 THROUGH 51

Several pieces (2.5 in. by 2.5 in.) of non-woven fiber glass mat (1.5 oz. per sq. yd.), commercially available as 'M710" from Owens-Corning, were saturated with the photocurable compositions indicated in Table II. The indicated additives were included before coating. The thus impregnated fabrics were photocured with a U.V. light (4000 $\mu$w./in.$^2$) for 5 minutes. The test results are given in Table II.

EXAMPLES 52 THROUGH 57

Several pieces of "M710" were saturated with the photocurable compositions indicated in Table III. The indicated additives were included before coating. The impregnated mats were photocured with a U.V. lamp (4000 $\mu$w./in.$^2$) for 5 minutes. The test results are given in Table III.

EXAMPLES 58 THROUGH 60

Several pieces of "M710" were treated with the photocurable composition indicated in Table IV. The indicated pigments or dyes were included in the photocurable formulation before coating. The impregnated mats were photocured with a U.V. lamp (4000 $\mu$w./in.$^2$) for 30 minutes. The test results are given in Table IV.

EXAMPLES 61 THROUGH 64

Various fabrics were impregnated with the photocurable composition indicated in Table V. The various fabrics are indicated in Table V. The impregnated fabrics were photocured with a U.V. lamp for 5 minutes. The test results are given in Table V.

EXAMPLES 65 THROUGH 67

Several pieces of multi-layered fiber glass were impregnated with the photocurable compositions indicated in Table VI. The fiber glass consisted of 3 non-woven layers (1.5 oz./yd.$^2$). An equal weight of photocurable composition was impregnated on each fiber glass sample. The impregnated samples were photocured with a U.V. lamp for 5 minutes. The test results are given in Table VI.

EXAMPLE 68

A piece of "M710" was impregnated with an equal weight of photocurable composition (100 parts of polymer J, 50 parts of Q–43 and 0.1 part of dibenzosuberone). The impregnated mat was stored in the dark for 37 days. The impregnated mat had slightly stiffened, but was very flexible. This example illustrates that impregnated mats can be stored for substantial periods of time before being photocured and used.

EXAMPLES 69 THROUGH 72

Several samples containing 3 layers of "M710" were impregnated with an equal weight of photocurable composition (the constituents of which are indicated in Table VII). Each sample was about ½ inch thick. The indicated additives were included in the photocurable composition before coating. The impregnated mats were photocured with a U.V. lamp (4000 μw./in.²) for 5 minutes. The test results are given in Table VII.

TABLE I

| Ex. No. | Parts Polymer J | Q-43 | Benzophenone | Fabrics | Photocured sample characteristics |
|---|---|---|---|---|---|
| 39 | 100 | 60 | 1.0 | No fabric—a control | Stiff. |
| 40 | 100 | 60 | 1.0 | Woven nylon | Very stiff. |
| 41 | 100 | 60 | 1.0 | Woven fiber-glass | Stiff. |
| 42 | 100 | 60 | 1.0 | ....do.... | Do. |
| 43 | 100 | 60 | 1.0 | ....do.... | Do. |
| 44 | 100 | 60 | 1.0 | Nonwoven mat (1.5 oz./yd.²) | Very stiff. |

TABLE II

| Ex. No. | Parts Polymer J | Q-43 | Benzophenone | Additive | Grams Photocurable composition | Fiber glass | Photocured sample characteristics |
|---|---|---|---|---|---|---|---|
| 45 | 100 (5678-8) | 60 | 1.6 | None | 12.5 | 1.7 | Very stiff. |
| 46 | 100 | 50 | 1.0 | ....do.... | 6.8 | 3.0 | Stiff. |
| 47 | 100 | 55 | 1.0 | 5 parts DAP¹ | 7.8 | 2.4 | Do. |
| 48 | 100 | 60 | 1.0 | None | 9.2 | 2.3 | Do. |
| 49 | 100 | 70 | 1.0 | 20 parts DAP¹ | 11.2 | 2.3 | Do. |
| 50 | 100 | 60 | 1.0 | 10 parts styrene | 14.2 | 1.8 | Very Stiff. |
| 51 | 100 | 60 | 1.0 | 10 parts polyester | 11.3 | 1.7 | Stiff. |

¹ DAP is diallyl phthalate (in this and the following tables).

TABLE III

| Ex. No. | Parts Polymer J | Q-43 | Dibenzosuberone | Additive | Grams Photocurable composition | Fiber glass | Photocured sample characteristics |
|---|---|---|---|---|---|---|---|
| 52 | ¹100 | 60 | 0.16 | None | 8.3 | .83 | Very stiff. |
| 53 | 100 | 50 | 0.1 | ....do.... | 7.6 | .89 | Do. |
| 54 | 100 | 55 | 0.1 | 5 parts DAP | 9.6 | .80 | Do. |
| 55 | 100 | 70 | 0.1 | 20 parts DAP | 10.6 | .88 | Stiff. |
| 56 | 100 | 60 | 0.1 | 10 parts styrene | 8.3 | .71 | Do. |
| 57 | 100 | 60 | 0.1 | 10 parts polyester | 9.9 | .66 | Very stiff. |

¹ (5678-14).

TABLE IV

| Ex. No. | Parts Polymer J | Q-43 | Dibenzosuberone | Dye¹ or pigment | Photocured sample characteristics |
|---|---|---|---|---|---|
| 58 | 100 | 50 | 0.1 | 0.4 glidden ruby | Stiff. |
| 59 | 100 | 50 | 0.1 | .04 phthalocyanine green | Do. |
| 60 | 100 | 50 | 0.1 | .04 riboflavin | Do. |

¹ Grams per 10 grams of photocurable composition.

TABLE V

| Example number | Parts Polymer J | Q-43 | Dibenzosuberone | Layers of fiber glass | Ratio of fiber glass to photocurable composition | Photocured sample characteristics |
|---|---|---|---|---|---|---|
| 61 | 100 | 50 | 0.1 | 7 layers of woven fiber glass | 25 to 75 | Very stiff. |
| 62 | 100 | 50 | 0.1 | 3 layers of nonwoven fiber glass | 50 to 50 | Do. |
| 63 | 100 | 50 | 0.1 | 4 layers of nonwoven fiber glass | 50 to 50 | Do. |
| 64 | 100 | 50 | 0.1 | 3 layers of nonwoven fiber glass | 50 to 50 | Do. |

TABLE VI

| Ex. No. | Parts Polymer J | Q-43 | Photocuring rate accelerator | Additive | Photocured sample characteristics |
|---|---|---|---|---|---|
| 65 | 100 | 50 | 1.0 benzophenone | None | Very stiff. |
| 66 | 100 | 50 | 0.1 dibenzosuberone | ....do.... | Do. |
| 67 | 100 | 55 | ....do.... | 5 parts DAP | Do. |

TABLE VII

| Ex. No. | Parts Polymer J | Q-43 | Photocuring rate accelerator | Additive | Tensile strength, p.s.i. | Flexural modulus, p.s.i. |
|---|---|---|---|---|---|---|
| 69 | 100 | 50 | 1.0 benzophenone | None | 9,360 | 153,000 |
| 70 | 100 | 50 | 0.1 dibenzosuberone | ....do.... | 13,270 | 416,000 |
| 71 | 100 | 55 | ....do.... | 5 parts DAP | 11,100 | 117,000 |
| 72 | 100 | 60 | ....do.... | 10 parts polyethylene | 11,100 | 180,000 |

It is claimed:

1. A process for preparing an element, which includes a porous support layer and a photocurable composition absorbed therein and thereon which comprises:

(a) absorbing a liquid photocurable composition consisting essentially of an unreacted mixture of about 2 to about 98 parts by weight of an ethylenically unsaturated polyene containing at least two reactive ene groups per molecule, 98 to 2 parts by weight of a polythiol containing at least two thiol groups per molecule, the sum of the functionality of said polyene and said polythiol being at least 4, and 0.0005 to about 30 parts by weight of a photocuring rate accelerator on said porous support layer; and (b) exposing the surface of said photocurable element containing said photocurable composition to ultraviolet radiation, electron-beam radiation, or gamma radiation, whereby said photocurable composition is converted to a cured solid polythioether.

2. A process as described in claim 1 wherein said exposed photocurable composition is converted to an insoluble hardened state.

3. A process as described in claim 1 wherein said support layer is translucent.

4. A process as described in claim 1 wherein the photocuring is achieved at a temperature between about 20° C. and about 130° C.

5. A process as described in claim 1 wherein said photocurable element is stored in a darkened environment before said exposure step is conducted.

6. A process as described in claim 1 wherein the thickness of said porous support layer is between 1 mil and 500 mils.

7. A process as described in claim 1 wherein said porous support layer is adhered to a nonporous support layer.

8. A process as described in claim 1 wherein said porous support layer comprises a fibrous paper derived from wood pulp.

9. A process as described in claim 1 wherein said porous support layer comprises a fibrous web derived essentially from woven or non-woven glass fibers or filaments.

10. A process as described in claim 1 wherein said porous support layer comprises a porous synthetic polymeric sheet.

11. A process as described in claim 1 wherein said porous support layer comprises a sheet of tightly compacted synthetic woven or non-woven fibers or filaments.

12. A process as described in claim 1 wherein said photocurable composition is dissolved in a solvent before it is absorbed in and on said support layer and wherein substantially all of said solvent is removed before said photocurable element is exposed.

13. A process as described in claim 12 wherein said photocurable composition solution has a viscosity before application of between about 0.25 poise and about 350 poises at or below 130° C.

14. A process as described in claim 1 wherein said polyene composition has a molecular weight in the range of about 50 to about 20,000; has a viscosity ranging from 0 to 20,000,000 centipoises between 20° C. and 130° C.; and has the general formula: [A]—(X)$_m$ wherein X is a member of the group consisting of

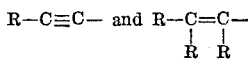

$m$ is an integer of at least two, R is independently selected from the group consisting of hydrogen, halogen, aryl, substituted aryl, aralkyl, substituted aralkyl, cycloalkyl, substituted cycloalkyl, alkyl and substituted alkyl groups containing 1 to 16 carbon atoms, and A is a polyvalent polymeric organic moiety free of (1) reactive carbon-to-carbon unsaturation and (2) unsaturated groupings in terminal conjunction with X.

15. A process as described in claim 1 wherein said polyene composition has a molecular weight in the range of about 50 to about 20,000; has a viscosity ranging from 0 to 20,000,000 centipoises between 20° C. and 130° C.; and has the general formula [A]—(X)$_m$ wherein X is a member of the group consisting of

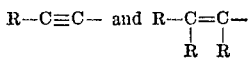

$m$ is an integer of at least two, R is independently selected from the group consisting of hydrogen, halogen, aryl, substituted aryl, aralkyl, substituted aralkyl, cycloalkyl, substituted cycloalkyl, alkyl and substituted alkyl groups containing 1 to 16 carbon atoms, and A has unsaturated groupings in terminal conjugation with X.

16. A process as described in claim 16 wherein the reactive ene groups are located primarily in the main chain.

17. A process as described in claim 16 wherein the polyene has a molecular weight in excess of 300.

18. A process as described in claim 1 wherein the two or more reactive ene groups in the polyene are located at the ends of or pendant to the main chain of the molecule.

19. A process as described in claim 1 wherein the two or more reactive ene groups in the polyene are located primarily within the main chain of the molecule.

20. A process as described in claim 1 wherein said photocurable composition contains one or more members of the group consisting of a filler, plasticizer, pigment, dye, photocuring inhibitor, and axtioxidant.

21. A process as described in claim 1 wherein said polythiol has a molecular weight between about 50 and about 20,000; and has viscosity between 20° C. and 130° C. between slightly above zero and about 20,000,000 centipoises.

22. A process as described in claim 21 wherein said polythiol has a molecular weight in excess of 300.

23. A process as described in claim 1 wherein said photocuring is achieved by exposure to ultraviolet radiation.

24. A process as described in claim 1 wherein said photocuring is achieved by exposure to electron beam radiation.

25. A process as described in claim 1 wherein said polyene has a molecular weight in the range of 150 to 20,000, a viscosity ranging from 0 to 20 million centipoises between 20° C. and 130° C. and an -ene or -yne functionality of at least 2 and is formed by reacting an organic epoxide containing at least two

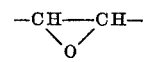

groups in its structure with a member of the group consisting of hydrazine, primary amines, secondary amines, tertiary amine salts, organic alcohols and organic acids wherein said group member contains at least one organic substituent containing a reactive ethylenically or ethynylically unsaturated group.

26. A process as described in claim 1 wherein said polyene has a molecular weight in the range 150 to 20,000, a viscosity ranging from 0 to 20 million centipoises between 20° C. and 130° C. and an -ene or -yne functionality of at least 2 and is formed by reacting an organic epoxide containing at least one organic substituent containing a reactive ethylenically or ethynylically unsaturated group with a member of the group consisting of hydrazine and an organic material containing at least two active hydrogen functions from the group consisting of

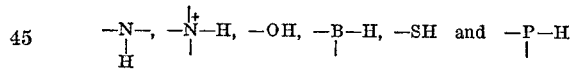

27. A photocurable element having (1) a porous support layer and (2) and unexposed liquid photocurable composition consisting essentially of an unreacted mixture of about 2 to about 98 parts by weight of an ethylenically unsaturated polyene having at least two reactive ene groups per molecule, 98 to 2 parts by weight of a polyethiol containing at least two thiol groups per molecule and 0.0005 to about 30 parts by weight of a photocuring rate accelerator, wherein said unexposed liquid photocurable composition is absorbed into and on said porous support and wherein said unexposed photocurable composition is converted to a solid cured polythioether upon exposure to ultraviolet radiation, electron beam radiation, or gamma radiation.

28. A photocurable element as described in claim 27 wherein said unexposed photocurable composition comprises (i) an ethylenically unsaturated polyene having at least two reactive ene groups per molecule, and (ii) a polythiol containing two or more thiol groups per molecule where the sum of the functionality of said polyene and said polythiol is at least four.

29. A photocurable element as described in claim 27 wherein said photocurable composition contains one or more members of the group consisting of a filler, plasticizer, pigment, dye, polymerization or curing inhibitor, and antioxidant.

30. A photocured element having (1) a porous support layer and (2) a photocurable composition consisting essentially of an unreacted mixture of about 2 to about 98 parts by weight of an ethylenically unsaturated polyene containing at least two reactive ene groups per molecule, 98 to about 2 parts by weight of a polythiol containing at least two thiol groups per molecule, the sum of the functionality of said polyene and said polythiol being at least 4, and 0.0005 to about 30 parts by weight of a photocuring rate accelerator, said composition having been absorbed into and on said porous support, wherein said photocurable composition has been converted to a solid cured polythioether by exposure to ultraviolet radiation, electron beam radiation, or gamma radiation.

31. A photocured element as described in claim 30 which is flexible.

32. A photocured element as described in claim 30 which is rigid.

References Cited

UNITED STATES PATENTS

| | | | |
|---|---|---|---|
| 2,998,329 | 8/1961 | Sovish et al. | 117—93.31 |
| 3,133,825 | 5/1964 | Rubens | 117—93.31 X |
| 3,338,810 | 8/1967 | Warner | 260—79 X |
| 3,403,187 | 9/1968 | Oswald et al. | 260—79 X |
| 3,421,501 | 1/1969 | Beightol | 117—93.31 X |
| 3,449,301 | 6/1969 | Noll et al. | 260—79 |

ALFRED L. LEAVITT, Primary Examiner

J. H. NEWSOME, Assistant Examiner

U.S. Cl. X.R.

117—126 GR, 138.8 A, 140 A, 155; 204—159.11; 260—79

PO-1050
(5/69)

UNITED STATES PATENT OFFICE
CERTIFICATE OF CORRECTION

Patent No. 3,676,195           Dated July 11, 1972

Inventor(s) Clifton L. Kehr and Walter R. Wszolek

It is certified that error appears in the above-identified patent and that said Letters Patent are hereby corrected as shown below:

In Claim 16, column 23, line 64, delete the numeral "16" and add the numeral -14-.

Signed and sealed this 31st day of October 1972.

(SEAL)
Attest:

EDWARD M. FLETCHER, JR.
Attesting Officer

ROBERT GOTTSCHALK
Commissioner of Patents